(12) United States Patent
Wong et al.

(10) Patent No.: US 7,536,410 B2
(45) Date of Patent: May 19, 2009

(54) DYNAMIC MULTI-DIMENSIONAL SCROLLING

(75) Inventors: Lyon K. F. Wong, Issaquah, WA (US); Cornelis K. Van Dok, Bellevue, WA (US); Colin Anthony, Kirkland, WA (US); Stephan Hoefnagles, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 384 days.

(21) Appl. No.: 11/112,330

(22) Filed: Apr. 22, 2005

(65) Prior Publication Data

US 2006/0242603 A1   Oct. 26, 2006

(51) Int. Cl.
*G06F 17/30* (2006.01)

(52) U.S. Cl. ............................. 707/102; 707/3; 707/101; 715/851; 715/854; 715/234

(58) Field of Classification Search ................... 707/3, 707/4, 5, 102, 101, 854, 234
See application file for complete search history.

(56) References Cited

U.S. PATENT DOCUMENTS

2006/0200455 A1 *  9/2006  Wilson ........................ 707/4

* cited by examiner

*Primary Examiner*—Cam Y T Truong
(74) *Attorney, Agent, or Firm*—Shook, Hardy & Bacon L.L.P.

(57) ABSTRACT

A system and method of automatically dynamically scrolling content in a dimension to enhance user navigation and display of a relevant node is disclosed. In one example, when a user scrolls vertically to a node in a folder tree control where the node/folder name is not visible, the folder tree view may be automatically dynamically scrolled horizontally such that the full name of the folder is viewable. The automatic dynamic scrolling alleviates the effort and stress related to requiring a user to manually scroll a view in two dimensions in a tree control.

7 Claims, 5 Drawing Sheets

DYNAMIC MULTI-DIMENSIONAL SCROLLING

A portion of the disclosure of this patent document may contain material which is subject to copyright protection. The copyright owner has no objection to the facsimile reproduction by anyone of the patent document or the patent disclosure, as it collectively appears in the Patent and Trademark Office patent file or records, but otherwise reserves all copyright rights whatsoever.

FIELD OF THE INVENTION

Aspects of the present invention generally relate to computers and/or computer operating systems. More specifically, aspects of the present invention relate to a method and system of a technical nature that enhances user navigation of information in a computer and/or computer operating system.

BACKGROUND OF THE INVENTION

Figure 2:
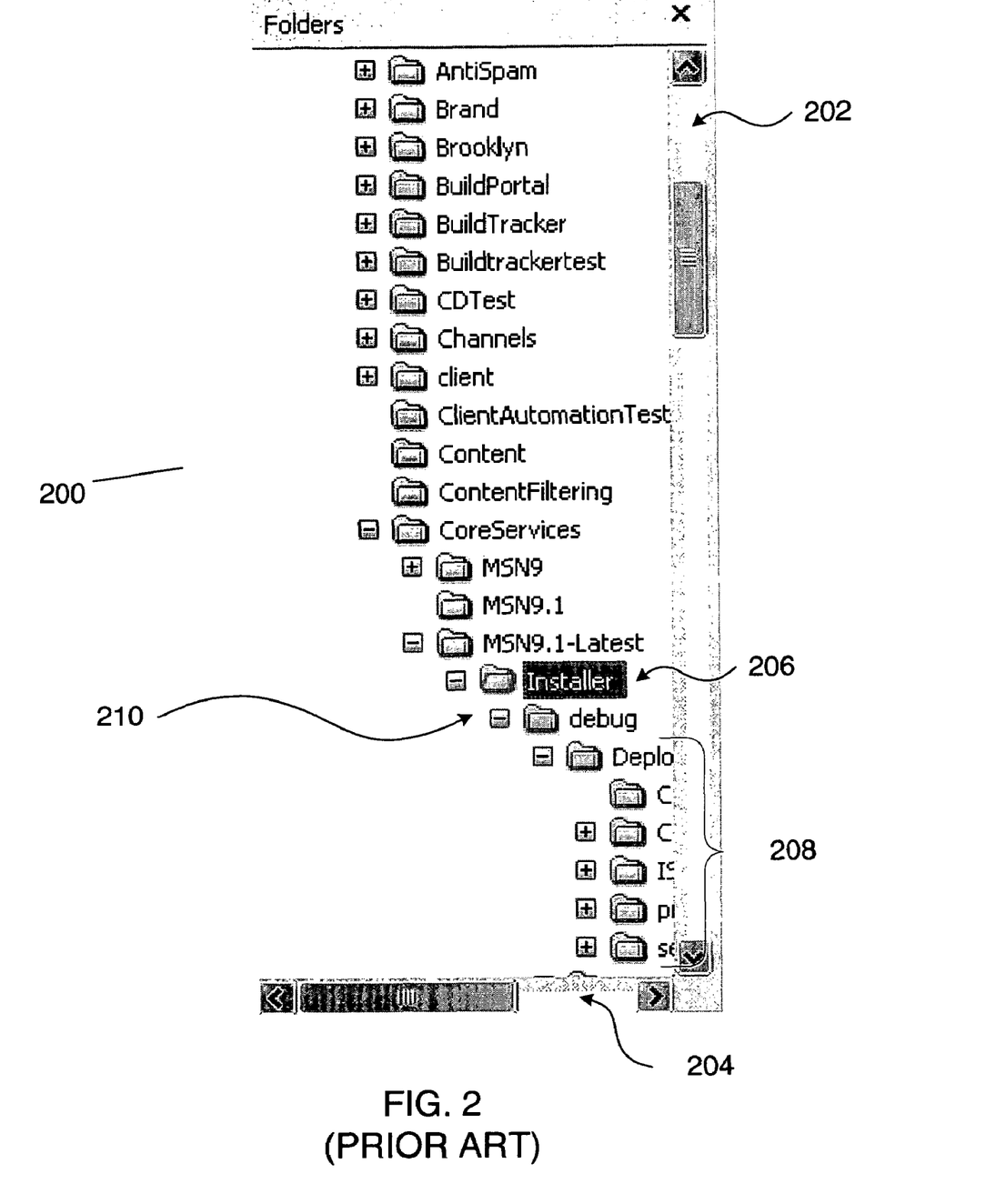
FIG. 2 illustrates a conventional prior art folder tree control displayed in a window pane.

Today most computer users interact with the machine by way of a graphical user interface which, by exploiting the computer's visual display and intuitive input devices such as the mouse, mediates access to the operating system, application programs, and stored data. The standard approach to the design of the user interface has relied on a simple visual metaphor in which data files are contained in folders organized within a hierarchically-structured file system tree. The user interface provides controls that permit the user to navigate through the file system tree in order to locate and act upon data. Moreover, these existing structures allow a user to navigate through a tree-like structure containing multiple nested nodes. FIG. 2 illustrates an exemplary prior art tree-like structure.

The real-world familiarity of the file/folder model of storage contributed to its acceptance and popularity among computer users, but such user interfaces were also successful because users typically stored a relatively small number of data files on their machines. The ease with which computer systems can now be used, coupled with the availability of massive amounts of inexpensive disk storage, have to some degree made the standard data storage interface a victim of its own success. Computers are now being used to store large quantities of personal data in a variety of different formats for use with many different applications. It is not uncommon for a user to have hundreds or thousands of text documents, photographs, audio files, and other data records stored across multiple hard disks, shared networks and other storage media. Frequently the expanded quantity of data items are nested in a hierarchy of node levels in a tree-like structure. Given such a development, drawbacks to the conventional folder tree storage model have become evident to computer users. In particular, the growth in the amount of data stored by users has made navigating through data less efficient and more cumbersome.

Although such prior art systems are easier to use than the command-line shell interfaces that preceded them, they can create a hardship for a user when navigating through the structure when these tree structures become deeply nested (e.g., a tree with a multiplicity of node levels). For example, these prior art folder tree structures are not user-friendly in that they distract a user by requiring the user to scroll horizontally as the user navigates from a root node to nodes in the folder tree that are deeply nested. Likewise, prior art folder tree structures reduce a user's efficiency by requiring a user to scroll horizontally as the user vertically navigates from deeply nested nodes in a folder tree towards a root node, or vice versa. Furthermore, prior art tree structures sometimes leave a user "blind" as the user navigates through node levels in a tree structure because the relevant node descriptor may lay outside the visible area of a narrow window, e.g., items 208 in FIG. 2.

There is no general mechanism for navigation comparable in ease and efficiency of use as the file system Explorer tree of released versions of Microsoft® Windows® brand operating systems. Therefore, there is a need in the art for a mechanism that would increase the efficiency of a user during navigation through a hierarchical structured file system tree displayed in a window with a narrow viewable area in one dimension. More generally, there is a need in the art for a mechanism of a technical nature for use with any navigational control that eliminates the burden on a user to navigate in a second dimension as a user traverses in a first dimension through the navigational control. Furthermore, it would be a technical advancement in the art to provide a novel user interface that enhances user efficiency (e.g., reduces the input required of a user) to navigate through a folder tree or other navigational control structure.

BRIEF SUMMARY OF THE INVENTION

The following represents a simplified summary of some embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in simplified form as a prelude to the more detailed description that is presented below.

The invention is intended to be practiced in the context of a computer system having a graphical user interface, or another kind of user interface, and a data storage subsystem, or a network connection to a data storage subsystem, in which data items are organized. In accordance with various embodiments of the invention, a computer-implemented method of user navigation of data is provided. The method automatically dynamically scrolls data in a second dimension while a user is manually navigating in a first dimension. The method includes displaying a view of content in a predetermined viewable area in a window pane. The method further includes determining whether a user input will result in a relevant node being at least partially obscured. The method also includes automatically dynamically horizontally scrolling a view of content for a predetermined distance so that a relevant node is entirely visible, or has increased visibility.

In various embodiment of the invention, the relevant node, as described earlier, may be the node in a tree control that has input or view focus or a node that is closest in proximity to a user's mouse pointer or other input indicia. While it is understood that the invention may be implemented as a method, it may also be implemented as a system for user navigation in a folder tree control or for navigation of other data, as described herein. Moreover, various aspects of the invention may be implemented in a computer readable medium having computer-executable instructions. The invention may be implemented by way of software, hardware, or a combination thereof. The invention may be implemented, for example, within an operating system shell, operating system component (e.g., a file browser), or within a running application program. Other features of the invention will become appar-

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

Figure 1:
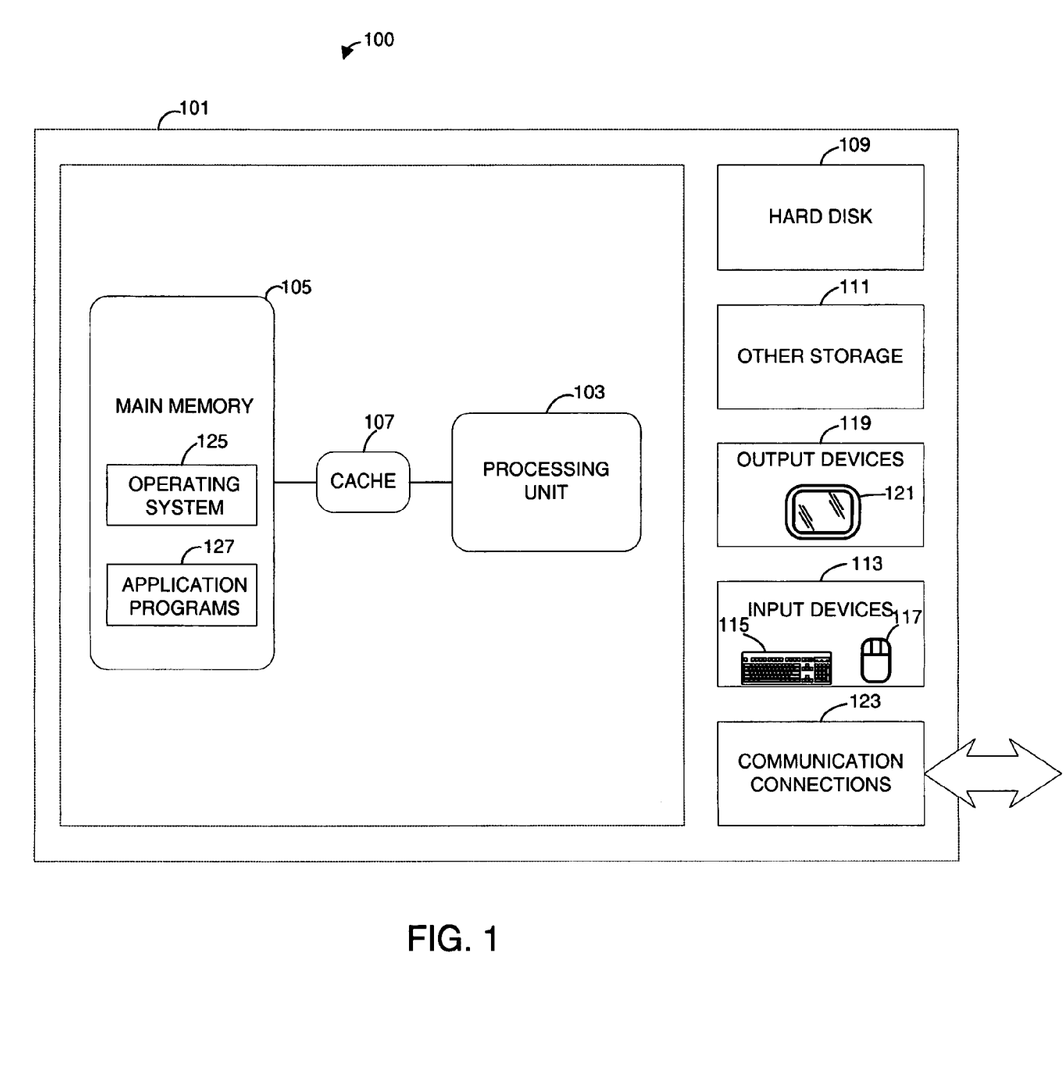
FIG. 1 illustrates a schematic diagram showing an illustrative computer operating environment within which various aspect of the present invention may be incorporated.

An example of a suitable operating environment 100 in which various aspects of the invention may be implemented is shown in the highly simplified schematic diagram in FIG. 1. The features of such environments are well-known to those having skill in the art and need not be described at length here. The operating environment 100 is only one example of a suitable operating environment and is not intended to suggest any limitation as to the scope of use or functionality of the invention. Suitable computing environments for use with the invention include any computing device or computing system that supports interaction between user and machine.

With reference to FIG. 1, an illustrative system for implementing the invention includes a computing device, such as device 101. Device 101 typically includes at least one processing unit 103 and main memory unit 105, and at least one level of cache memory 107 connected to or situated within the processing unit 103 and serving as a buffer for the main memory 105. Device 101 has additional storage, including at least one magnetic hard disk 109 that serves as nonvolatile secondary storage and which is additionally used along with the main memory 105 in providing virtual memory. Device 101 may also have other storage 111, such as optical disks, removable magnetic disks, magnetic tape, and other removable and nonremovable computer-readable media capable of nonvolatile storage of program modules and data and accessible by device 101. Any such storage media may be part of device 101. To facilitate user-machine interaction, device 101 has input devices 113, such as a keyboard 115 and a mouse 117 or other pointing device, and output devices 119, including a monitor or other display device 121. Device 101 also typically includes one or more communication connections 123 that allow the device to communicate data with other devices.

Programs, comprising sets of instructions and associated data for the device 101, are stored in the memory 105, from which they can be retrieved and executed by the processing unit 103. Among the programs and program modules stored in the memory 105 are those that comprise or are associated with an operating system 125 as well as application programs 127. The device 101 has one or more systems of logical data storage, such as a file system or alternative systems using database-related techniques, associated with the operating system 125. Such systems of logical data storage serve as interfaces that map logically-organized data to data physically located on secondary storage media, such as data stored in clusters or sectors on the hard disk 109.

Computing device 101 includes forms of computer-readable media. Computer-readable media include any available medium that can be accessed by the computing device 101. Computer-readable medium may comprise communication media. Communication media include any information delivery media and typically embody data in a modulated data signal such as a carrier wave or other transport mechanism. Storage medium includes cache memory, volatile and non-volatile storage medium, removable and non-removable storage medium such as magnetic disks and memory implemented in any method or technology for storage of information such as computer-readable instructions, object code, data structures, program modules, or other data.

The use of the terms "a," "an" and "the" and similar referents in the context of describing the invention, especially in the context of the following claims, is to be construed to cover both the singular and the plural, unless otherwise indicated herein or clearly contradicted by context. The terms "comprising," "having," "including," and "containing" are to be construed as open-ended terms (meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples or exemplary language herein (e.g., "such as") is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations on those preferred embodiments may become apparent to those having ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Various aspects of the present invention may be used to enhance navigation through a conventional folder tree control or navigation of other data. The traditional folder tree control 200 in FIG. 2 allows a user to view, organize, and retrieve data. Typically a vertical scroll bar 202 and horizontal scroll bar 204 accompany the folder tree control as one mechanism to permit user navigation through the folder tree structure. As a user navigates vertically through the hierarchy of the folder tree structure, the relevant node may no longer be fully visible in the narrow viewable window pane. For example, in FIG. 2, in response to a user repeatedly pressing the "down arrow" key when the node 206 labeled "Installer" in FIG. 2 initially has focus, the non-visible, or obscured, nodes 208 below the "Installer" node each, in turn, become highlighted and receive focus. These nodes, however, are not entirely visible in the narrow window pane. The user must subsequently horizontally scroll the narrow viewable window pane to the right to make those nodes 208 fully visible.

Figure 3:
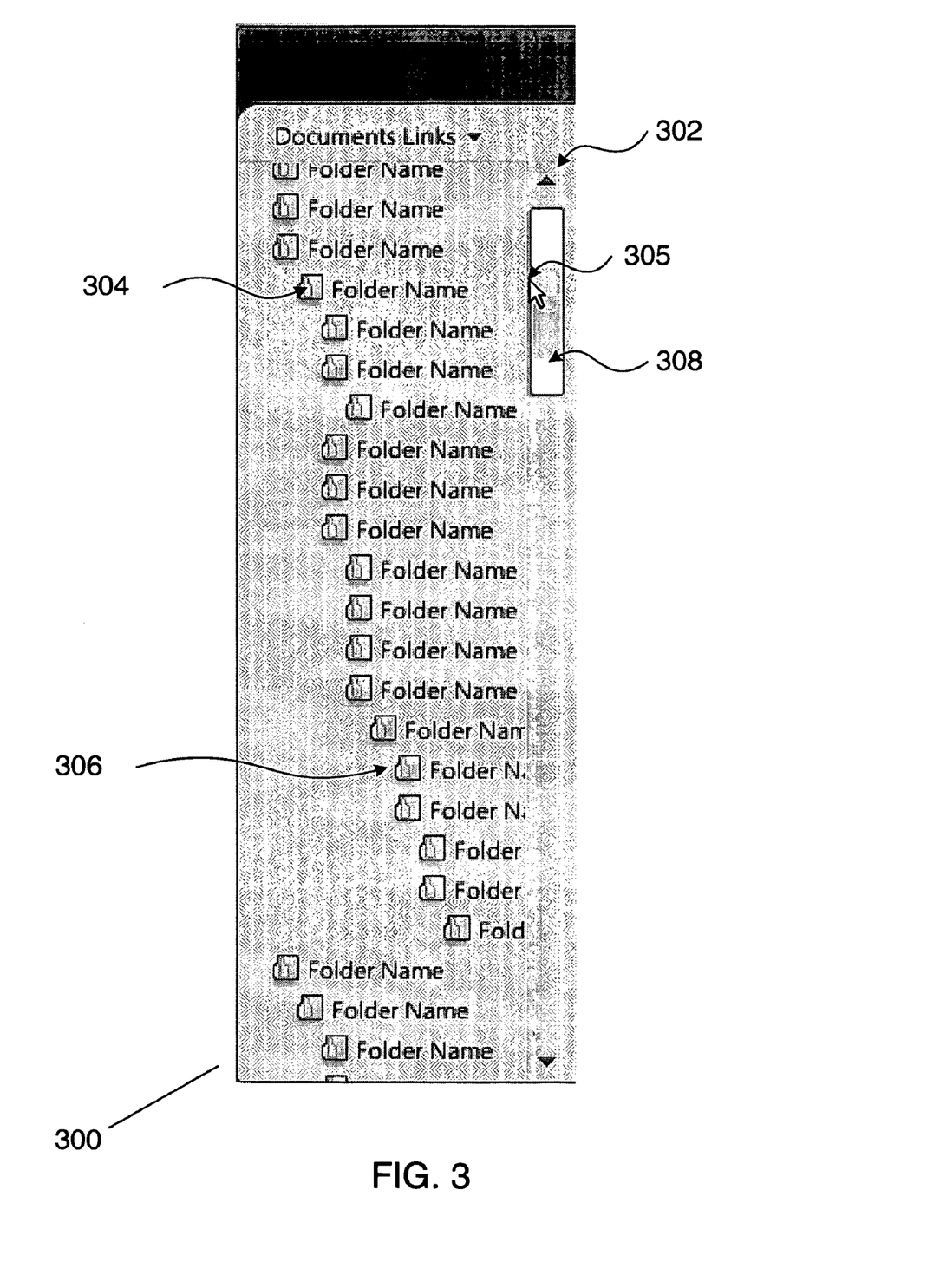
FIG. 3 illustrates a view of a hierarchical tree control structure implemented in accordance with various illustrative aspects of the invention.

In FIG. 3, a folder tree in accordance with various aspects of the present invention is displayed. One skilled in the art will appreciate that FIG. 3 is merely one example of a folder tree in accordance with various aspects of the present invention. Aspects of the present invention may be implemented with a variety of tree controls or other data navigation. In one example, a folder tree may be a hierarchically tree-shaped set of user interface controls that expose branches of the tree in hierarchical levels as navigated by the user. The user of a folder tree control may click on a node exposed by the tree control to expand the node in place; the node can be collapsed if it is already expanded. A small widget, such as one displaying '+' or '−', may be used to indicate whether a node is collapsed or expanded, as is known in the art. The expansion of a node shows the nested nodes hierarchically under the currently selected node. The user may expand/collapse a node by, for example, clicking on a button, clicking on the node, or clicking on the displayed widget.

A folder tree control enables a user to navigate across hierarchically arranged data, as is known in the art. In FIG. 3, a vertical scroll bar 302 accompanies the folder tree control as one mechanism to permit user navigation through the folder tree structure. For example, in FIG. 3, in response to a user dragging the floating vertical scroll bar control 308 towards the bottom of the window pane, the folder tree control scrolls the visible content up, thereby displaying previously undisplayed nodes from below the window 300.

According to an illustrative aspect of the invention, when a user navigates along one dimension (e.g., vertically), the folder tree control may automatically scroll in another dimension (e.g., horizontally) to ensure that a node relevant to the user is within the visible area of the window 300. The relevant node may be a current node, a node having input focus, or an otherwise selected node. The relevant node may be a node in the tree structure, for example, that is horizontally alongside the mouse pointer's position. When the user scrolls, expands, or collapses any node of the folder tree control, thereby causing the relevant node to no longer to be fully and/or partially visible, the folder tree control may automatically horizontally scroll the folder tree such that the relevant node is visible within the window 300.

Those of skill in the art will appreciate that, while the present illustrative embodiment performs automatic horizontal scrolling, other embodiments may automatically scroll vertically in response to horizontal scrolling by a user, e.g., where the user is navigating other types of data which lend themselves to horizontal arrangement rather than vertical. For example, various aspects of the invention may be implemented in a system where a substantial percentage of user input indicative of navigation is in the horizontal dimension. In that case, one skilled in the art may implement various aspects of the invention such that there is automatic dynamic vertical scrolling.

For example, at the instance of FIG. 3, when the mouse pointer is at location 305 to the immediate right of the then relevant node 304, the displayed tree need not be scrolled horizontally because the folder name of node 304 is fully visible. However, when the user drags the floating vertical scroll bar control 308 using the mouse pointer 305 such that the mouse pointer 305 is at location horizontally alongside the node 306, then the displayed tree view may be automatically scrolled horizontally, as further described below. In this example, the mouse pointer 305 is in horizontal proximity to node 306. Further in this example, the displayed tree view is scrolled horizontally to the right, resulting in the tree moving to the left, by a predetermined distance such that the folder name is fully visible, or as fully visible as possible given the width of the predetermined viewable area 300. If the folder name is truncated for any reason, then the predetermined distance may be such that the dynamic horizontal scrolling results in the entire truncated folder name being fully visible.

One skilled in the art, after being provided with the teachings disclosed herein, will appreciate that the predetermined distance for automatically scrolling a navigational control (e.g., a folder tree control) may vary among embodiments of the invention. In one example, the predetermined distance for automatically scrolling is equal to the distance necessary to align a relevant node 306 with a right edge of the predetermined viewable area 300. In a second example, a relevant node is wider than the predetermined viewable area 300, and the predetermined distance for automatically scrolling may equal the distance necessary to align a relevant node 306 with a left edge of the predetermined viewable area 300. In a third example, the predetermined distance for automatically scrolling may equal the distance necessary to align a relevant node 306 in the center of the predetermined viewable area 300. These examples are merely illustrative of an appropriate predetermined distance to be used for approximately aligning the relevant node 306 in the predetermined viewable area 300, and they should not be narrowly construed to limit the scope of the claims.

In accordance with various aspects of the invention, the dynamic horizontal scrolling discussed may be delayed by an appropriate time period. For example, the horizontal scrolling may be set to occur immediately, or may be set to occur 100 ms after a user first positions the mouse pointer alongside a relevant node. At least one benefit of implementing a time delay is to create or provide the appearance of smooth movement. One skilled in the art will appreciate that the amount of time delay set may be varied as appropriate.

Figure 4A:
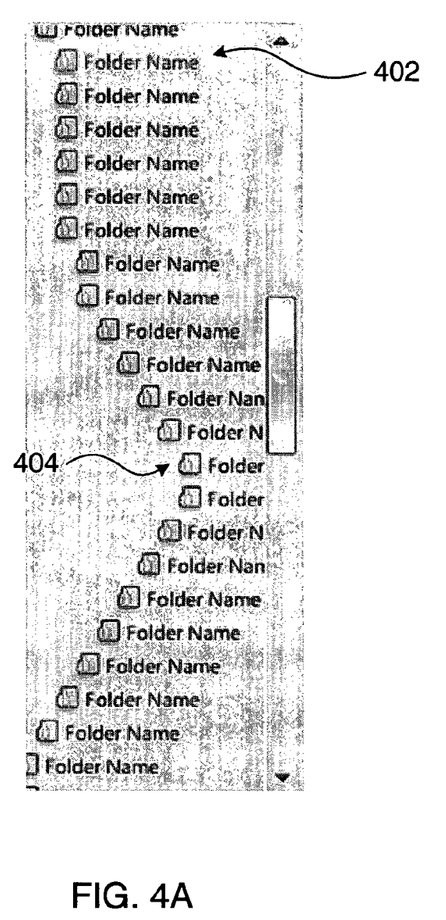
FIGS. 4A and 4B illustrate a screenshot of a folder tree control implemented in accordance with various illustrative aspects of the invention.
Figure 4B:
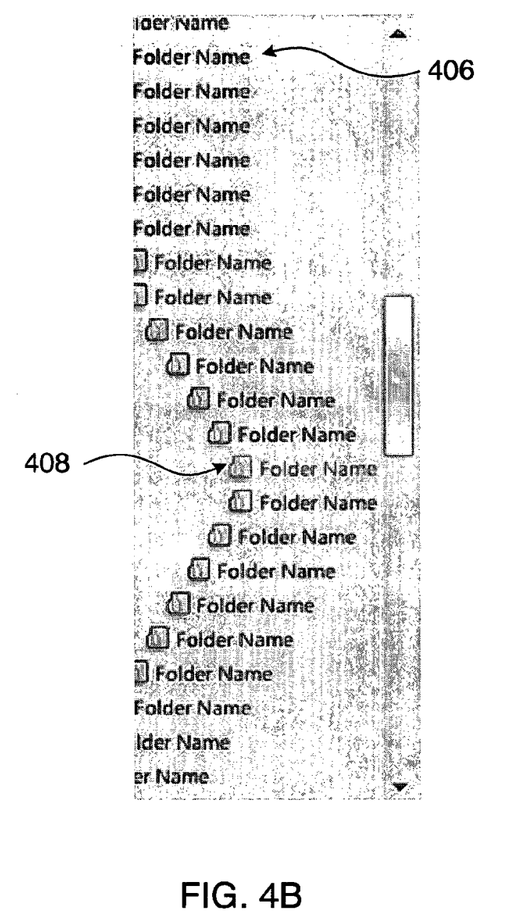

FIGS. 4A and 4B illustrate screenshots of an illustrative user interface for viewing and organizing stored data in accordance with various aspects of the invention. One skilled in the art will appreciate that similar navigational control interfaces are available for documents, messages, video files, and contacts, with the navigational control interface in each case being specifically adapted for the kind of data item that is presented. Such content-oriented interfaces may be provided with an operating system product as a component of the user interface, or shell.

In FIG. 4A, a node 402 currently has focus responsive to user input. By way of just one example, such user input may include a user moving a mouse pointer near or over the node 402. Upon receiving focus on the relevant node (node 402), the tree control determines whether horizontal scrolling is appropriate. In this case, the folder name (i.e., descriptor) is entirely visible. Therefore, automatic horizontal scrolling is not performed. However, when the user moves the mouse pointer near or over node 404, then node 404 receives focus. FIG. 4B illustrates just such a folder tree control in accordance with various aspects of the invention. The then relevant node 408 currently has focus in FIG. 4B. Node 408 is the same data item as Node 404, however, Node 408 has focus in FIG. 4B while Node 404 did not have focus in FIG. 4A. Furthermore, in FIG. 4B the folder tree has automatically dynamically scrolled horizontally to the right by a predetermined distance to make the entire name of Node 408 visible. In this case, the node name is "Folder Name" and is not truncated. The predetermined distance that the folder tree control is horizontally scrolled may be determined by calculating the amount of distance required to approximately align the end of the node name at or near the edge of the internal window pane. Meanwhile, the previously-focused node 406 is no longer highlighted and may not be fully visible.

The view of the navigational control is dynamically scrolled horizontally by an appropriate distance after it is determined that scrolling (e.g., horizontal scrolling) is desired. One skilled in the art will appreciate that at least one advantage of the instant invention is that it does not require the display of a horizontal scroll bar, thereby resulting in additional viewable area on a limited display screen for displaying data of the folder tree. Although a horizontal scroll bar is not required, the instant invention does not preclude a horizontal scroll bar from being included and/or used. For example, it is conceivable that a horizontal scroll bar could be beneficial to a user to visually indicate the current horizontal position of the displayed view in relation to the folder tree.

Figure 5:
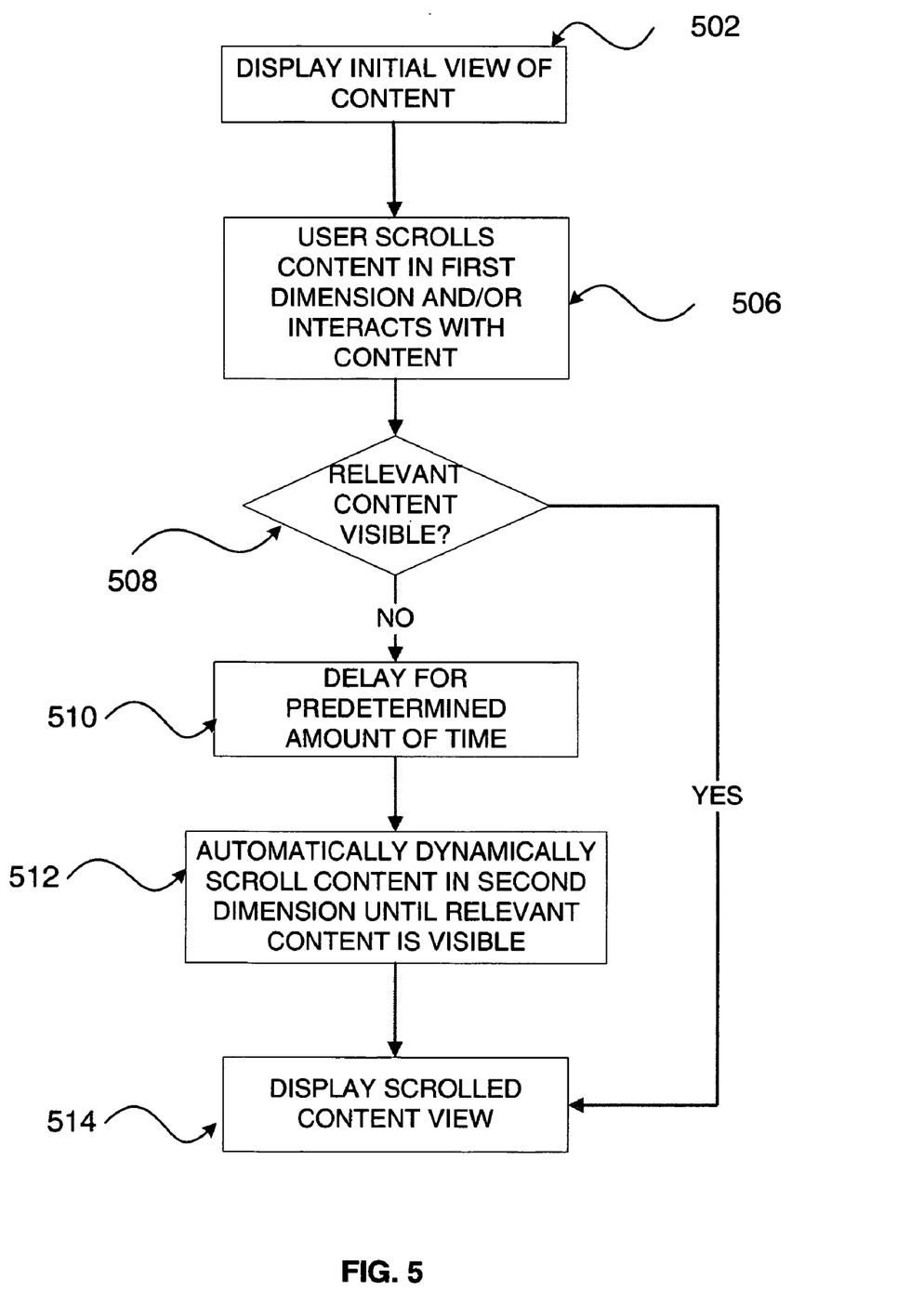
FIG. 5 is a flowchart describing a method for providing content for display to a user navigating through the content in accordance with various illustrative embodiments of the invention.

In accordance with various aspects of the invention, FIG. 5 illustrates a flowchart describing a computer-implemented method for automatically dynamically scrolling content in one dimension responsive to user-controlled scrolling or navigation of the content in another dimension. Those skilled in the art will appreciate that the steps illustrated in FIG. 5 may be performed in other than the recited order, and that one or more steps illustrated in FIG. 5 may be optional.

In step 502, a user is presented with an initial view of content. The content may be displayed in the form of a hierarchical folder tree control with multiple levels of nodes. FIG. 4A is just one example of a first view of a hierarchical folder tree. FIG. 2 is yet another example of a first view of a hierarchical folder tree.

In step 506, the user scrolls content in a first dimension and/or interacts with the content. These acts are just some examples of user inputs indicative of navigation of the content. Various user inputs scroll the relevant content by moving its position in the predetermined viewable area. For example, a form of user navigation that results in vertical scrolling of content is when a user drags a floating vertical scroll bar control 206 towards the top or bottom of a window pane 200 containing a folder tree control. Meanwhile, various non-scrolling user inputs interact with the relevant content by updating the designation of which content is relevant to the user. An example is when a user presses the "up arrow," "down arrow," "page up," or "page down" button on an input device 115 while the folder tree control window is active. Moreover, an example of a non-scrolling user input may be illustrated in FIG. 4A. If a user presented with the view of content illustrated in FIG. 4A moves a mouse pointer over or near node 408, then node 408 receives focus. In this example, the user interacts with the content, rather than scrolling the content in a first dimension. In another example the user may be both interacting with the content and scrolling the content in a first dimension simultaneously. In yet another example, with respect to FIG. 2, a user may interact with a folder tree by pressing an expand widget, resulting in sub-nodes 208 of the node 210 to which the widget corresponds being only partially displayed in the viewable area of the folder tree control.

In step 508, if the relevant content is fully visible, then no automatic scrolling may be necessary. If the relevant content is not fully visible (or is at least partially obscured) in the predetermined viewable area, then the relevant content may be scrolled in a second dimension to a state where the relevant content has increased visibility. By way of just one example, the relevant content in FIG. 4A is node 402, which has focus in that illustration. After a user interacts with the content displayed in FIG. 4A (e.g., in step 506) by moving a mouse pointer over or near node 404, then node 404 will receive focus and become the relevant content. Since node 404 is at least partially non-visible (obscured) in the predetermined viewable area, the relevant content may be automatically scrolled in a horizontal dimension, as further described below. In another example, with respect to FIG. 2, if a user selected an expand widget corresponding to node 210 causing sub-nodes 208 to be only partially displayed in the viewable area, then the relevant content may comprise both the node 210 and its sub-nodes 208.

In step 510, the performance of step 512 is delayed for a predetermined amount of time. In various embodiments of the invention, the amount of the predetermined time period of delay can be zero or any other value greater than zero. For example, in FIG. 4A, a predetermined time period of delay of 100 ms may elapse before the folder tree control is dynamically scrolled horizontally by a predetermined distance, resulting in the view illustrated in FIG. 4B. One skilled in the art will appreciate that the amount of time delay set may vary as appropriate.

In step 512, the content is automatically dynamically scrolled in a second dimension for a predetermined distance. For example, in the case of the folder tree control in FIG. 3, if the relevant node 306 is found to be not entirely visible, then the folder tree control may be horizontally scrolled by a predetermined distance such that the end of the node descriptor (e.g., folder name) is approximately aligned with the right edge of the predetermined viewable area. One of skill in the art will recognize that in various instances it may be desirable to approximately align the relevant node with the left edge of the predetermined viewable area or to approximately align the relevant node at or near the center of the predetermined viewable area. In each of these cases, the node shall be construed to be approximately aligned with a predetermined edge of the viewable area. The predetermined distance in each instance may also vary accordingly. For example, with respect to FIG. 2, in response to a user selecting the expand widget corresponding to node 210, the relevant content may be approximately aligned with the left edge of the predetermined viewable area such that sub-nodes 208 are provided with increase visibility.

Furthermore, one should recognize that the use of the modifier, "second," should not be construed to mean that a first dimension is necessary or required. For example, if in step 506 a user interacts with the content displayed in FIG. 4A by moving the mouse pointer so that it changes focus from node 402 to node 404, then in step 512, the content may be automatically dynamically scrolled in a horizontal dimension. In that case, even though there was no initial scrolling in the vertical dimension, the "second dimension" would be the horizontal dimension.

Finally, in step 514, the user is provided with an updated view of the content in the predetermined viewable area. For example, FIG. 4B is a scrolled content view of a folder tree resulting after step 514. The updated view provides a user with increased visibility of relevant content (node 408) in the narrow viewable area in FIG. 4B.

The present invention has sometimes been described in terms of preferred and illustrative embodiments thereof. Numerous other embodiments, modifications and variations within the scope and spirit of the appended claims will occur to persons of ordinary skill in the art from a review of this disclosure.

We claim:

1. A computer-implemented method of user navigation of data in a computer system having a graphical user interface and a data storage subsystem in which data items are displayed as a hierarchical tree on the graphical user interface, the method comprising:

displaying a first view of a hierarchical tree control, by using a computer having a memory, in a viewable area, wherein the hierarchical tree control comprises a plurality of nested nodes arranged in a hierarchy along a first dimension;

in response to user input indicative of navigation of the hierarchical tree control, determining if user input will result in a relevant node in the hierarchical tree control being at least partially obscured, wherein the navigation comprises navigation within the first dimension;

delaying for a first predetermined amount of time if the user input results in the relevant node being at least partially obscured;

if the user input results in the relevant node being at least partially obscured then automatically scrolling the first view of the hierarchical tree control in a second dimension for a predetermined distance, wherein the second dimension is perpendicular to the first dimension;

waiting at least a second predetermined amount of time after the determining before the automatically scrolling, wherein the second predetermined amount of time is approximately 100 milliseconds, wherein the automatically scrolling comprises:

determining if the relevant node is wider than the viewable area; and calculating the predetermined distance, the predetermined distance is equal to a distance necessary to align the relevant node with a left edge of the viewable area if the relevant node is wider than the viewable area, and the predetermined distance is equal to the distance necessary to align the relevant node with a right edge of the viewable area if the relevant node is not wider than the viewable area, wherein the first dimension comprises a vertical dimension and wherein the second dimension comprises a horizontal dimension, wherein the user input indicative of navigation comprises non-scrolling user input that interacts with the hierarchical tree control, wherein the non-scrolling user input comprises a user selecting an expand widget displayed in the viewable area, wherein the relevant node is a node in the hierarchical tree control that is closest in proximity to a mouse pointer displayed on the graphical user interface; and displaying a second view of the hierarchical tree control, wherein the relevant node is substantially entirely visible, wherein the hierarchical tree control is displayed at a first position along the second dimension.

2. The method of claim 1, wherein said non-scrolling user input comprises a user providing focus to a node in said hierarchical tree control.

3. The method of claim 1, wherein said relevant node is a node in said hierarchical tree control that has focus.

4. A computer-readable storage medium storing computer-executable instructions for performing a computer-implemented method comprising:

displaying a first view of a hierarchical tree control, by using a computer having a memory, in a viewable area, wherein the hierarchical tree control comprises a plurality of nested nodes arranged in a hierarchy along a first dimension;

in response to user input indicative of navigation of the hierarchical tree control, determining if user input will result in a relevant node in a hierarchical tree control being at least partially obscured, wherein the navigation comprises navigation within the first dimension;

delaying for a first predetermined amount of time if the user input results in the relevant node being at least partially obscured;

if the user input results in the relevant node being at least partially obscured then automatically scrolling the first view of the hierarchical tree control in a second dimension for a predetermined distance, wherein the second dimension is perpendicular to the first dimension;

waiting at least a second predetermined amount of time after the determining before the automatically scrolling, wherein the second predetermined amount of time is approximately 100 milliseconds, wherein the automatically scrolling comprises:

determining if the relevant node is wider than the viewable area; and calculating the predetermined distance, the predetermined is equal to a distance necessary to align the relevant node with a left edge of the viewable area if the relevant node is wider than the viewable area, and the predetermined distance is equal to the distance necessary to align the relevant node with a right edge of the viewable area if the relevant node is not wider than the viewable area, wherein the first dimension comprises a vertical dimension and wherein the second dimension comprises a horizontal dimension, wherein the user input indicative of navigation comprises non-scrolling user input that interacts with the hierarchical tree control, wherein the non-scrolling user input comprises a user selecting an expand widget displayed in the viewable area, wherein the relevant node is a node in the hierarchical tree control that is closest in proximity to a mouse pointer displayed on the graphical user interface; and displaying a second view of the hierarchical tree control, wherein the relevant node is substantially entirely visible, wherein the hierarchical tree control is displayed at a first position along the second dimension.

5. A system for user navigation of data in a hierarchical tree control in a graphical user interface, the system comprising:

a computer having a computer readable storage medium;

a memory for storing components;

a component for displaying a first view of the hierarchical tree control, in a viewable area, wherein the hierarchical tree control comprises a plurality of nested nodes arranged in a hierarchy along a first dimension;

a component for determining if user input will result in a relevant node in the hierarchical tree control being at least partially obscured in response to user input indicative of navigation of the hierarchical tree control, wherein the navigation comprises navigation within the first dimension;

a component for delaying for a first predetermined amount of time if the user input results in the relevant node being at least partially obscured;

a component for automatically scrolling the first view of the hierarchical tree control in a second dimension for a predetermined distance if the user input results in the relevant node being at least partially obscured, wherein the second dimension is perpendicular to the first dimension;

a component for waiting at least a second predetermined amount of time after the determining before the automatically scrolling, wherein the second predetermined amount of time is approximately 100 milliseconds, wherein the automatically scrolling comprises:

a component for determining if the relevant node is wider than the viewable area; and calculating the predetermined distance, the predetermined distance is equal to a distance necessary to align the relevant node with a left edge of the viewable area if the relevant node is wider than the viewable area, and the predetermined distance is equal to the distance necessary to align the relevant node with a right edge of the viewable area if the relevant node is not wider than the viewable area, wherein the first dimension comprises a vertical dimension and wherein the second dimension comprises a horizontal dimension, wherein the user input indicative of navigation comprises non-scrolling user input that interacts with the hierarchical tree control, wherein the non-scrolling user input comprises a user selecting an expand widget displayed in the viewable area, wherein the relevant node is a node in the hierarchical tree control that is closest in proximity to a mouse pointer displayed on the graphical user interface; and a component for displaying a second view of the hierarchical tree control, wherein the relevant node is substantially entirely visible, wherein the hierarchical tree control is displayed at a first position along the second dimension.

6. The system of claim 5, wherein said component for automatically scrolling further comprises a component for waiting for a predetermined amount of time before automatically scrolling the first view of a hierarchical tree control.

7. The system of claim 5, wherein said relevant node is a node in said hierarchical tree control that has focus.

* * * * *